(12) United States Patent
Ohkawa et al.

(10) Patent No.: US 11,476,075 B2
(45) Date of Patent: Oct. 18, 2022

(54) ELECTRON SOURCE AND ELECTRON SOURCE UNIT (71) Applicant: JAPAN AEROSPACE EXPLORATION AGENCY, Tokyo (JP)

(72) Inventors: Yasushi Ohkawa, Tokyo (JP); Satomi Kawamoto, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 0 days.

(21) Appl. No.: 17/430,697

(22) PCT Filed: Nov. 15, 2019

(86) PCT No.: PCT/JP2019/044838
§ 371 (c)(1),
(2) Date: Aug. 12, 2021

(87) PCT Pub. No.: WO2020/166155
PCT Pub. Date: Aug. 20, 2020

(65) Prior Publication Data
US 2022/0157551 A1 May 19, 2022

(30) Foreign Application Priority Data
Feb. 12, 2019 (JP) .............................. JP2019-022266

(51) Int. Cl.
H01J 29/96 (2006.01)
H01J 29/48 (2006.01)
(52) U.S. Cl.
CPC ............ H01J 29/96 (2013.01); H01J 29/481 (2013.01)

(58) Field of Classification Search
CPC ................................ H01J 29/96; H01J 29/481
See application file for complete search history.

(56) References Cited

U.S. PATENT DOCUMENTS

2002/0142698 A1 10/2002 Kosugi et al.
2015/0380199 A1 12/2015 Liu et al.

FOREIGN PATENT DOCUMENTS

| CN | 104078293 A | 10/2014 |
| JP | 2004-047254 A | 2/2004 |
| JP | 2005-174818 A | 6/2005 |
| JP | 2007-109514 A | 4/2007 |

(Continued)

OTHER PUBLICATIONS http://www.kenkai.jaxa.jp/research/debris/deb-edt.html, along with the English Abstract.

(Continued)

Primary Examiner — Anne M Hines
(74) Attorney, Agent, or Firm — Saliwanchik, Lloyd & Eisenschenk (57) ABSTRACT

[Object] To provide an electron source that is lightweight, simple in configuration, and capable of suppressing characteristic degradation or recovering characteristics without causing an increase in power consumption.
[Solving Means] A CNT electron source includes: a CNT emitter 32 for emitting electrons; a gate electrode 33 for extracting electrons from the CNT emitter 32; and a gate power supply connection switching relay 37a and a CNT emitter grounding switching relay 37b that cause the gate electrode 33 to emit electrons to irradiate the CNT emitter with electrons.

5 Claims, 7 Drawing Sheets (56) References Cited

FOREIGN PATENT DOCUMENTS

| JP | 2007-131124 A | 5/2007 |
|---|---|---|
| JP | 2007-172862 A | 7/2007 |
| JP | 2014-165105 A | 9/2014 |

OTHER PUBLICATIONS

Shimada, A. et al., "Effect of Atomic Oxygen Irradiation on Field Emission Cathodes in Low Earth Orbit," 2014, *JSASS Aerospace Tech. Japan*, 12:1-6, Japan Society for Aeronautical and Space Sciences and ISTS.

Ohkawa, Y. et al., "Operation of a Carbon Nanotube Field-Emission Cathode in Low Earth Orbit," *Conference: 2018 31st International Vacuum Nanoelectronics Conference (IVNC)*, pp. 1-2, IEEE.

International Search Report dated Feb. 10, 2020 International Application No. PCT/JP2019/044838.

FIG.1(a)

(b) Current-voltage characteristics obtained through electron irradiation after AO irradiation

ELECTRON SOURCE AND ELECTRON SOURCE UNIT

CROSS-REFERENCE TO RELATED APPLICATIONS

This application is the U.S. national stage application of International Patent Application No. PCT/JP2019/044838, filed Nov. 15, 2019, which claims the benefit under 35 U.S.C. § 119 of Japanese Application No. 2019-022266, filed Feb. 12, 2019, the disclosures of each of which are incorporated herein by reference in their entirety.

TECHNICAL FIELD

The present invention relates to an electron source attached to, for example, one end of a tether, and an electron source unit.

BACKGROUND ART

In space, electron emission sources are necessary in various applications. Examples of the electron emission sources include neutralizers for neutralizing ion beams for electric propulsion of ion engines, Hall thrusters, and the like, electron sources for propulsion systems called electrodynamic tethers, electron sources for inhibiting abnormal charging of spacecrafts, and electron sources for various scientific experiments.

Of those, the electrodynamic tether (hereinafter, referred to as "EDT") is a propulsion system in which a long conductive wire (tether) is extended in low Earth orbits and an electrical current is passed therethrough to use an electromagnetic force (J×B force), which is generated by the interference between the geomagnetic field and the electrical current, as a propulsion force (see Non-Patent Literature 1). Especially in the case of orbital descent, a self-induced electromotive force can be utilized for electrical current driving, and thus the EDT is a propulsion system that does not need electric power or fuel in principle.

The EDT is considered to be particularly useful as orbital descent means for discarding space debris (space junk), which exists in large numbers in low Earth orbits (see Patent Literature 1).

In order to pass a certain level of large electrical current through the tether, it is necessary to attach an electron source to one end of the tether and emit electrons to outer space.

It is desirable that the electron source is as simple and low-power a system as possible when mounted on a spacecraft. In that respect, a field emission type electron source that merely applies a voltage between electrodes is suitable for an electron source of a spacecraft. Ln particular, a CNT electron source that uses a carbon nanotube (hereinafter, referred to as "CNT") as an electronic material allows low-voltage driving by the electric field concentration effect provided by a nanoscale shape, and is expected as an electron source for space, including applications to the EDT. The CNT electron source includes a CNT emitter for emitting electrons, a gate electrode for extracting electrons, a mask for covering the unnecessary CNT emitter area, and further an insulating spacer for retaining the electrical insulation between electrodes (see Patent Literature 2).

The increasing space debris is particularly problematic in low Earth orbits where there is a large amount of atomic oxygen (hereinafter, referred to as "AO"). So, it has been found that the electron emission performance of the CNT electron source is degraded due to the chemical/physical reaction between the CNT and AO. Specifically, the driving voltage required to obtain an equal electron-emission current rises due to the influence of AO. Since AO collides with objects flying in low Earth orbits at a velocity of approximately 8 km/s, which is close to an orbital velocity, the performance degradation of the electron source due to the damage of the CNT is significant if the CNT electron source is mounted on the front side of a flying object (see Non-Patent Literature 2).

For that reason, it has been proposed to take care not to turn the electron emission surface to the front side or proposed to use a shielding plate when the CNT electron source is used in low Earth orbits (see Non-Patent Literature 3). This ensures a certain length of life, which has been confirmed by simulated experiments performed so far (see Non-Patent Literature 2) and by experiments carried out in low Earth orbits (see Non-Patent Literature 3).

However, even if the CNT electron source is arranged so as not to directly receive the high-energy AO as described above, the performance degradation (rise of driving voltage) progresses, though it is gentle. This is thought to result from the adsorption of oxygen onto the CNT. When the space debris removal in low Earth orbits is assumed, it may take one year or more of a mission period, and the rise of the driving voltage by a long-term operation will cause problems such as an increase in power consumption by the high voltage of a mounted voltage source, an increase in system mass, and further the damage of the electron source due to electrical breakdown. This greatly affects the formation of the system. So, it has been thought difficult to use the CNT electron source for long periods of time particularly in orbits where the AO concentration is high.

A similar problem occurs when the CNT electron source is used in a terrestrial vacuum chamber or device. For example, it has been found that, during the operation of the electron source immediately after the vacuum chamber is closed to evacuate the inside thereof, oxygen and moisture at the time of exposure to the atmosphere remain (are adsorbed) onto the CNT and thus cause damage to the CNT. This leads to short-term/long-term degradation of characteristics.

In order to solve such problems, a method of desorbing a substance adsorbed onto the CNT has been conceived so far. Examples of the method include baking (heating) using a heater (e.g., Patent Literature 3), ion irradiation using an ion source (e.g., Patent Literature 4), and an irradiation method of high-energy electrons of keV or higher using an electron gun (Patent Literature 5).

CITATION LIST

Patent Literature

Patent Literature 1: Japanese Patent Application Laid-open No. 2007-131124

Patent Literature 2: Japanese Patent Application Laid-open No. 2007-109514

Patent Literature 3: Japanese Patent Application Laid-open No. 2004-047254

Patent Literature 4: Japanese Patent Application Laid-open No. 2007-172862

Patent Literature 5: U.S. Patent Application No. 2002-0142698

Non-Patent Literature

Non-Patent Literature 1: http://www.kenkai.jaxa.jp/research/debris/deb-edt.html

Non-Patent Literature 2: Atsuko SHIMADA et al., 'Effect of Atomic Oxygen Irradiation on Field Emission Cathodes in Low Earth Orbit' TRANSACTIONS OF THE JAPAN SOCIETY FOR AERONAUTICAL AND SPACE SCIENCES, AEROSPACE TECHNOLOGY JAPAN 2014 Volume 12 Issue ists29 Pages Pb_59-Pb_64.

Non-Patent Literature 3: Yasushi Ohkawa et al., 'Operation of a Carbon Nanotube Field-Emission Cathode in Low Earth Orbit' Conference: 2018 31st International Vacuum Nanoelectronics Conference (IVNC), Kyoto Japan, July 2018.

DISCLOSURE OF INVENTION

Technical Problem

While each of the above means is effective on the ground, it is difficult to additionally mount a heater, an ion source, an electronic gun, or the like on a spacecraft because of an increase in system weight, complexity of the system, and an increase in power consumption. Further, it is also unclear whether those methods are effective in suppressing the performance degradation of the CNT electron source due to AO peculiar to the low Earth orbits.

In view of the circumstances as described above, it is an object of the present invention to provide an electron source and an electron source unit that are lightweight, simple in configuration, and capable of suppressing characteristic degradation or recovering characteristics without causing an increase in power consumption.

Solution to Problem

The inventors of the present invention have found that the characteristic degradation progresses when the CNT electron source is irradiated with AO, but the characteristics are hardly degraded when the CNT electron source is irradiated with electrons after the AO irradiation. The present invention has been made on the basis of such a finding.

In other words, in order to achieve the above object, an electron source according to the present invention includes: an emitter for emitting electrons, the emitter including a nanocarbon material; a gate electrode for extracting electrons from the emitter; and an irradiation section that causes the gate electrode to emit electrons to irradiate the emitter with electrons.

If the emission of electrons from the emitter is started while active oxygen is adsorbed onto the emitter formed of a nanocarbon material such as a CNT, the CNT or the like will be damaged. In the present invention, however, the emitter is irradiated with electrons, and oxygen adsorbed onto the emitter is desorbed, so that the damage to the CNT or the like is suppressed and the characteristic degradation of the emitter does not progress. Further, the present invention employs a configuration in which the emitter is irradiated with electrons using constituent elements originally possessed by the electron source. This makes it possible to provide a lightweight and a simple configuration and also suppress characteristic degradation or recover characteristics without causing an increase in power consumption.

In the electron source according to an embodiment of the present invention, the irradiation section includes a switching section that switches a connection destination of a gate power supply for originally supplying power to the gate electrode from the gate electrode to the emitter and also disconnects grounding to the emitter.

In the electron source according to an embodiment of the present invention, the irradiation section includes a gate power supply for originally supplying power to the gate electrode, a bias application power supply for applying a bias of a positive potential to the emitter, and a switching section that switches a connection destination of the gate power supply from ground to the bias application power supply.

An electron source unit according to the present invention includes at least two electron sources each having the configuration described above, and has a mode of irradiating the emitter of one of the electron sources with electrons emitted from another one of the electron sources, and a mode of irradiating the emitter of the other one of the electron sources with electrons emitted from the one of the electron sources.

In the electron source according to an embodiment of the present invention, the irradiation section includes a connection section that electrically connects a tether and the emitter to each other.

Advantageous Effects of Invention

According to the present invention, it is possible to provide a lightweight and simple configuration and suppress characteristic degradation or recover characteristics without causing an increase in power consumption.

BRIEF DESCRIPTION OF DRAWINGS

FIGS. 1(*a*) and 1(*b*) show experimental results obtained by irradiating a CNT electron source with AO at an energy equivalent to an impact velocity in an orbit and obtaining current-voltage characteristics at each stage of the amount of irradiation.

MODE(S) FOR CARRYING OUT THE INVENTION

An electron source according to an embodiment of the present invention includes: a CNT emitter for emitting electrons; a gate electrode for extracting electrons from the CNT emitter; and an irradiation section that causes the gate electrode to emit electrons to irradiate the emitter with electrons; in which the irradiation section includes a switching section that switches a connection destination of a gate power supply for originally supplying power to the gate electrode from the gate electrode to the CNT emitter and also disconnects grounding to the CNT emitter.

In a CNT electron source according to an embodiment of the present invention, a positive potential is actively applied to the CNT emitter of the CNT electron source that is normally at a potential equivalent to that of space plasmas or at a negative potential. Since the periphery of a spacecraft is filled with plasmas in low Earth orbits, the CNT emitter is set at a positive potential to attract electrons to the CNT emitter from the plasmas in low Earth orbits and to cause the electrons to collide with the CNT emitter, so that the oxygen attached to the CNT is desorbed. Thus, the CNT emitter can be cleaned. In this case, it is not necessary to mount a new electron gun or the like. Further, the power supply originally mounted to apply a voltage to the gate electrode can be used, and thus problems such as an increase in weight and system complexity do not occur. It is particularly effective to perform this method after the launch and before the first use of the electron source in orbits. Adsorbed substances accumulated on the CNT emitter are removed first, and thus significant initial characteristic degradation can be prevented.

Figure 1A:
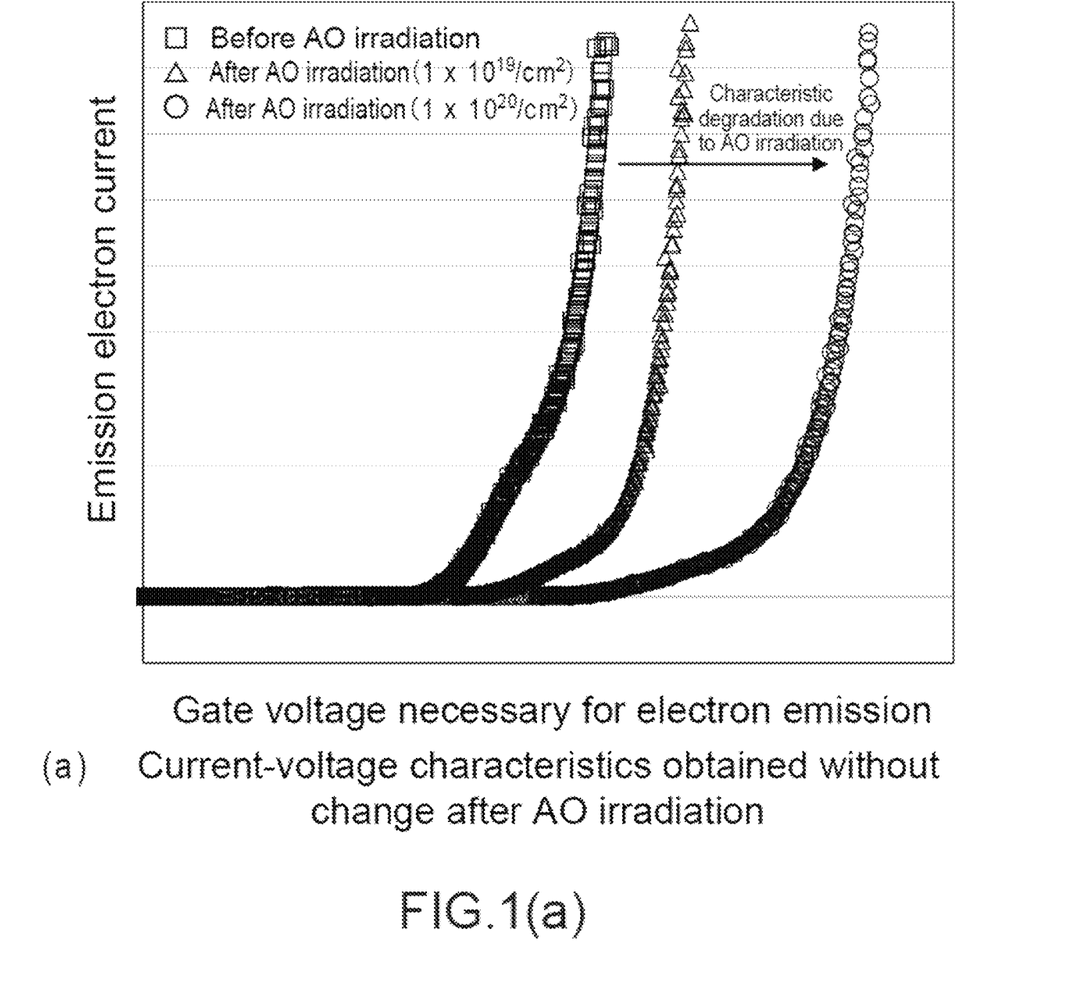
Figure 1B:
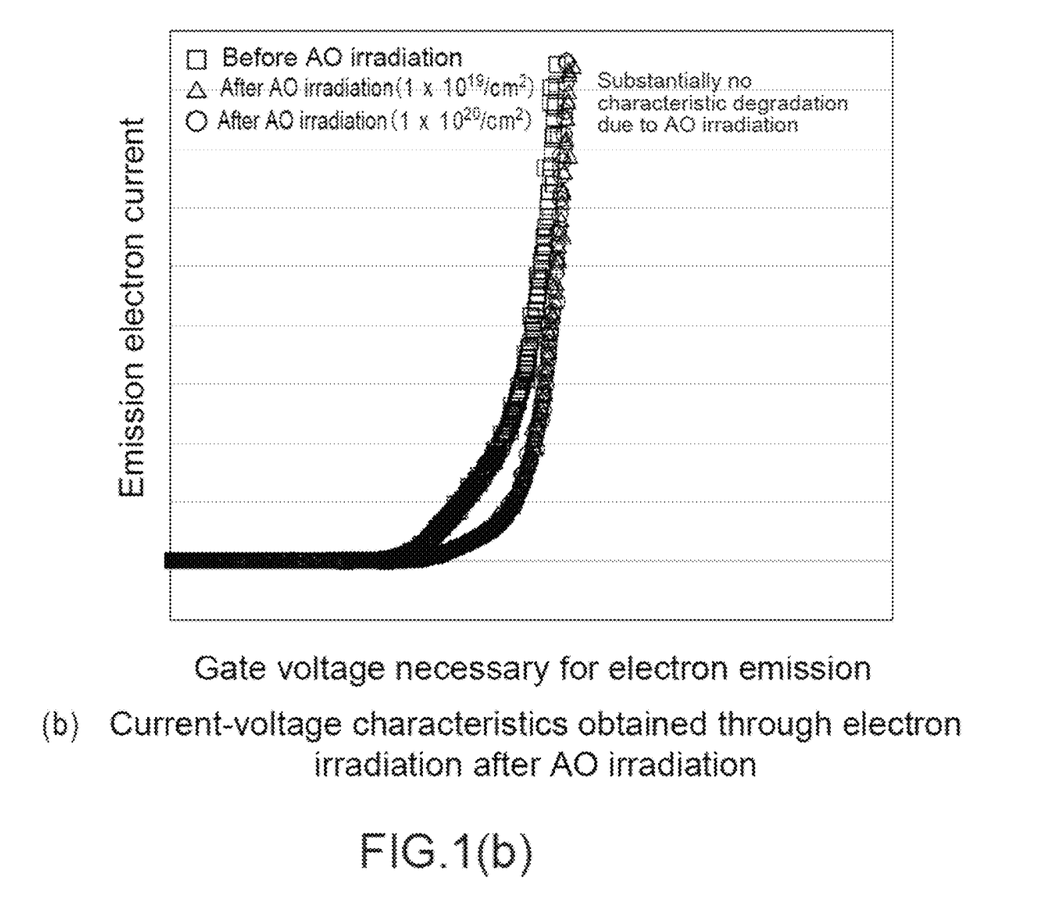

In such a manner, the inventors of the present invention have confirmed by an AO irradiation experiment on the ground that the characteristic degradation of the CNT electron source due to AO can be suppressed by irradiating the CNT emitter with electrons. FIGS. 1(a) and 1(b) show the results obtained by irradiating the CNT electron source with AO at an energy equivalent to an impact velocity in an orbit and obtaining current-voltage characteristics at each stage of the amount of irradiation. FIG. 1(a) shows results of obtaining the current-voltage characteristics without change after the AO irradiation. FIG. 1(b) shows results of obtaining the current-voltage characteristics through the electron irradiation performed once after the AO irradiation. In this experiment, the electron emission surface of the CNT electron source is disposed parallel to the flow of AO. As shown in FIGS. 1(a) and 1(b), if the electron irradiation is not performed, a gate voltage necessary for the electronic emission rises (the curve shifts to the right) as the amount of AO irradiation increases, whereas if the electron irradiation is performed, the characteristics hardly change. It has been confirmed from those results that the electron irradiation to the CNT emitter suppresses the electron-emission characteristic degradation caused by AO. The AO fluence of $1\times10^{20}$ cm$^2$ irradiated in this experiment is equivalent to the amount corresponding to several years in orbits at an altitude of 800 km, for example, and is thus a sufficient amount of AO irradiation in view of the space debris removal application.

A CNT electron source according to an embodiment of the present invention includes: a CNT emitter for emitting electrons; a gate electrode for extracting electrons from the CNT emitter; and an irradiation section that causes the gate electrode to emit electrons to irradiate the emitter with electrons, the irradiation section including a connection section that electrically connects a tether and the CNT emitter to each other.

Figure 2:
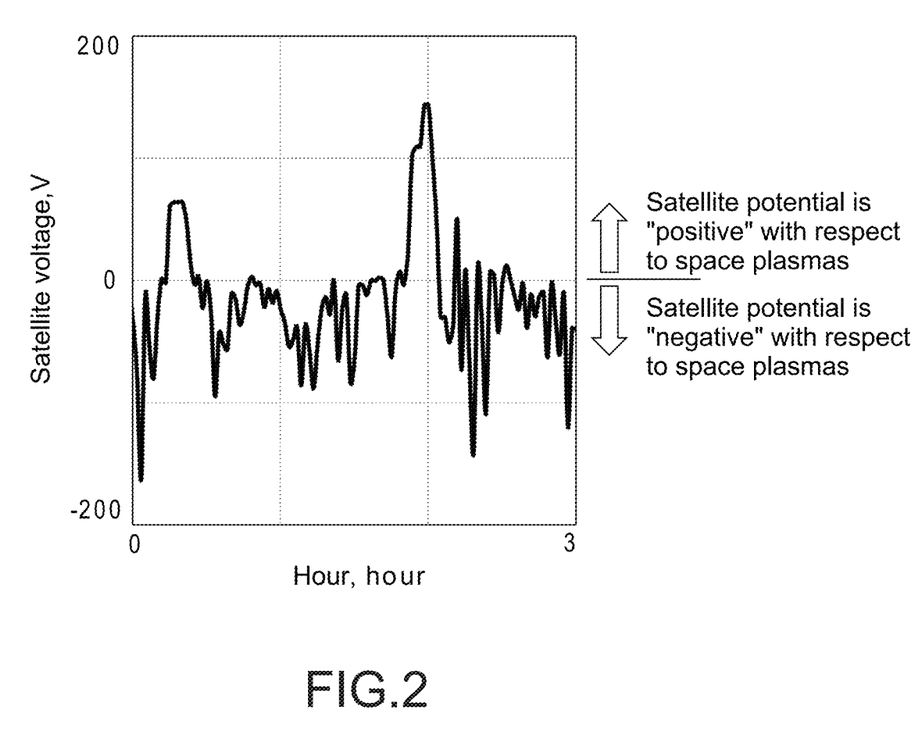
FIG. 2 shows exemplary results of a numerical simulation performed on the potential change of a debris removal satellite when an EDT moves in an orbit with a large inclination.

In the CNT electron source according to an embodiment of the present invention, on the assumption that the CNT electron source is used for an EDT, a self-induced electromotive force generated by the tether is used. Space debris is particularly concentrated in orbits with a large orbital inclination (e.g., 98 degrees) among low Earth orbits. When the EDT is attached to the orbiting space debris, the positive and negative directions of the geomagnetic field with respect to tether motion are reversed during orbiting, and thus the direction of the self-induced electromotive force generated along the tether is reversed during orbiting. This means that the potential of a debris removal satellite (i.e., the potential of the CNT emitter) with respect to the space plasmas becomes positive or negative during orbiting. FIG. 2 shows an example of the potential change of the debris removal satellite when the EDT moves in an orbit with a large inclination. While the debris removal satellite is negative with respect to the space plasmas, the CNT electron source performs the normal operation of emitting electrons to outer space, but while the debris removal satellite is positive with respect to the space plasmas, because of the reversed potential, the electron source fails to emit electrons to outer space. Therefore, this period has been considered to be wasteful time for the mission.

However, from the viewpoint of suppressing the characteristic degradation by irradiating the CNT emitter with electrons, the above-mentioned period is not wasteful. Since the CNT electron source according to an embodiment of the present invention includes the connection section that electrically connects the tether and the CNT emitter to each other, such a cleaning action that electrons in the space plasmas spontaneously flow into the CNT emitter and the oxygen adsorbed onto the CNT is desorbed occurs while the debris removal satellite is positive with respect to outer space. After the potential relation is reversed, the emission of electrons is started from the CNT emitter in the state where the CNT emitter is cleaned, so that the characteristic degradation can be suppressed to the minimum. Consequently, it is conceived that the CNT electron source can be operated at a lower voltage (i.e., lower power) for longer periods of time than in the case of continuing to simply emit electrons in a low Earth orbit environment. In this case, it is important to maintain the electric connection between the CNT emitter and the tether.

The CNT electron source according to an embodiment of the present invention allows a long-term use of the CNT electron source in a low Earth orbit environment, which has been considered difficult so far.

In particular, if the above-mentioned electron irradiation using the space plasmas is performed before the CNT electron source is operated for the first time in an orbit, it is possible to eliminate the adsorbed substances accumulated on the CNT at the time of storage on the ground, at the time of launch, and in a later AO-exposed environment, and to greatly suppress the initial characteristic degradation.

Further, since the characteristic degradation of the CNT electron source (rise of driving voltage) can be substantially suppressed, it is possible to reduce the voltage level of the driving voltage of the electron source. This makes it possible to use a lightweight power supply with low power consumption and further to inhibit the occurrence of electrical breakdown due to a high voltage, and thus to increase the system formability.

The above-mentioned points produce effects regardless of where the CNT electron source is applied.

Further, since the CNT electron source according to an embodiment of the present invention includes the connection section that electrically connects the tether and the CNT emitter to each other, the electron source can be provided with a long life without necessity of an additional device or the like, and thus the feasibility of the space debris removal system using the EDT can be increased.

Hereinafter, embodiments of the present invention will be described with reference to the drawings.

<Configurations of EDT and CNT Electron Source>

First, the EDT to which the CNT electron source according to the present invention is attached will be described.

Figure 3:
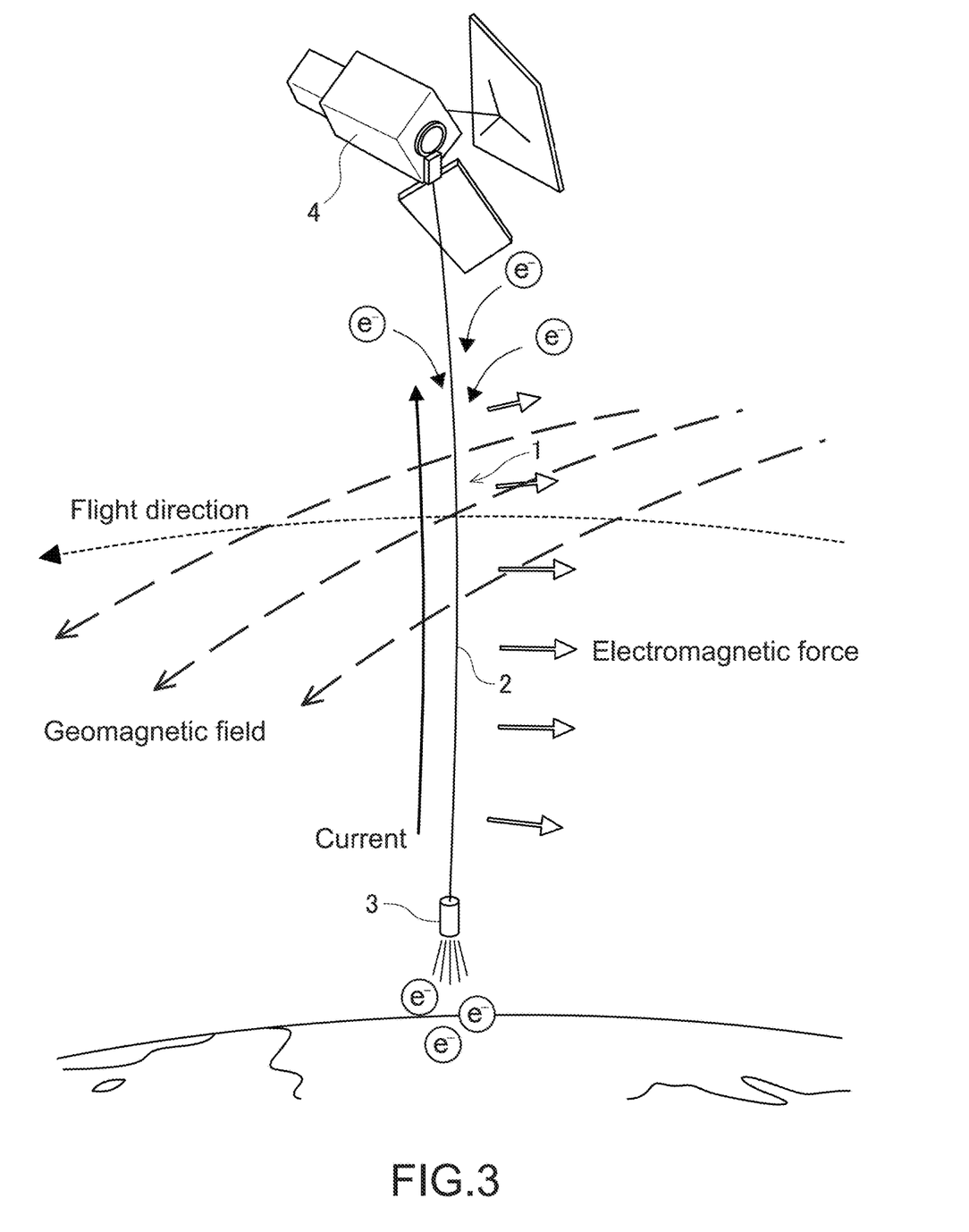
FIG. 3 is a diagram showing a configuration of the EDT.

FIG. 3 is a diagram showing a configuration of the EDT. An EDT 1 includes a tether 2 and a CNT electron source 3 connected to one end of the tether 2. A debris 4 is attached to the other end of the tether 2.

Typically, the EDT 1 extends the conductive tether (wire) 2 with a kilometer-grade length in an orbit, passes an electrical current therethrough by the CNT electron source 3 to generate an electromagnetic force (J×B force) by the interference with the geomagnetic field, and utilizes the force as a propulsion force. The EDT 1 has the major advantage of providing a propulsion force without using fuel. In the case of orbital descent, a potential difference for driving an electrical current is also generated by the self-induced electromotive force, which is particularly advantageous.

Figure 4:
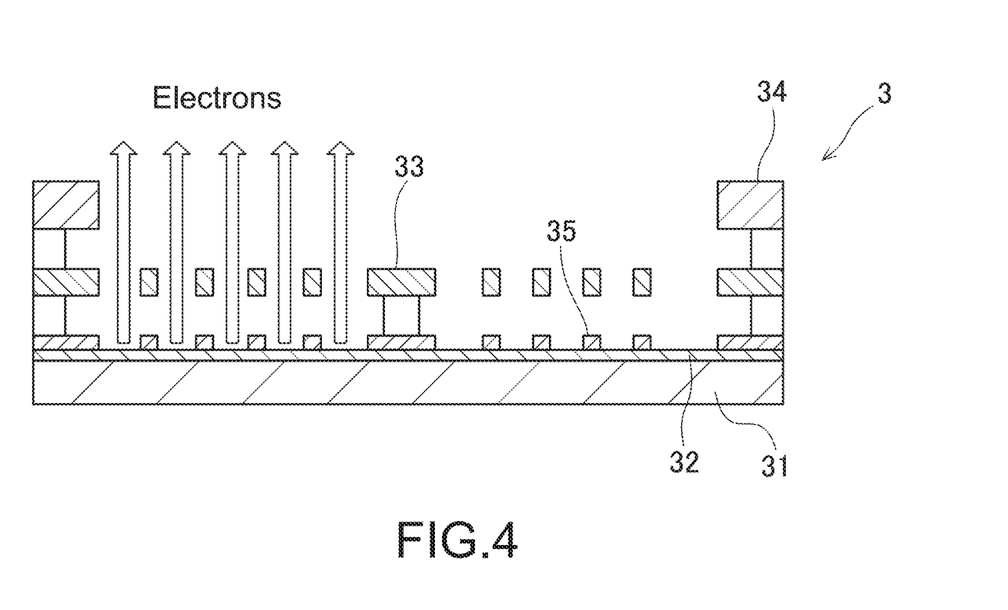
FIG. 4 is a schematic cross-sectional diagram showing a configuration of the CNT electron source.

FIG. 4 is a schematic cross-sectional diagram showing a configuration of the CNT electron source 3. The CNT electron source 3 is a field emission type electron source using a CNT as an electron-emitter material. A CNT emitter 32 is formed on a substrate 31, and a gate electrode 33 is disposed to face the CNT emitter 32. There is a gap between the CNT emitter 32 and the gate electrode 33 for emitting the electrons, which have been emitted from the CNT emitter 32, to the outside. Reference numeral 34 denotes a shield member.

Since the CNT electron source 3 is capable of emitting electrons only by grounding the CNT emitter 32 to the satellite ground and applying a positive potential to the gate electrode 33, the CNT electron source 3 has a simple structure and is further capable of reducing the driving voltage (gate voltage) by the electric field concentration effect at the tip of the CNT of the CNT emitter 32.

Such a CNT electron source 3 includes a mask 35 located on the surface of the CNT emitter 32. The mask 35 is located to face the region other than the open area of the gate electrode 33. The mask 35 is provided to focus the electron beams into the open area of the gate electrode 33 and to reduce the loss current flowing into the gate electrode 33. The technology regarding the mask 35 is described in detail in Patent Literature 2, and the description of the Patent Literature 2 is within the scope of the disclosure of this specification.

First Embodiment

Figure 5:
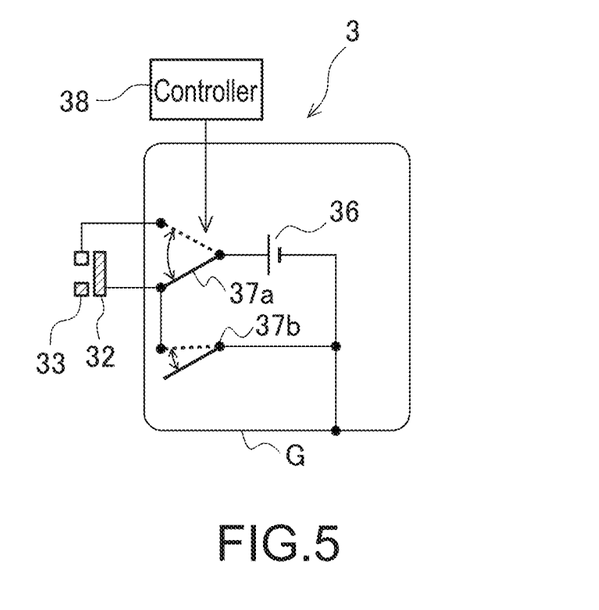
FIG. 5 is a circuit diagram showing a circuit configuration of a CNT electron source according to a first embodiment of the present invention.

FIG. 5 is a circuit diagram showing a circuit configuration of a CNT electron source 3 according to a first embodiment of the present invention.

The CNT electron source 3 has a circuit configuration in which a CNT emitter 32 can be set at a positive potential with respect to outer space. Normally, a CNT electron source includes a high-voltage power supply (gate power supply) for applying a voltage to the gate electrode. The CNT electron source 3 includes, as an irradiation section that irradiates the CNT emitter 32 with electrons, a gate power supply connection switching relay 37*a* and a CNT emitter grounding switching relay 37*b* each serving as a switching section that switches a connection destination of a gate power supply 36 from the gate electrode 33 to the CNT emitter 32 and also disconnects grounding G to the CNT emitter 32. In the gate power supply connection switching relay 37*a* and the CNT emitter grounding switching relay 37*b* shown in FIG. 5, the solid lines indicate a state where the grounding to the CNT emitter 32 is disconnected and the gate power supply 36 is connected to the CNT emitter 32 (cleaning mode), and the dotted lines indicate a state where the CNT emitter 32 is grounded and the gate power supply 36 is connected to the CNT emitter 32 (normal mode). A controller 38 controls the switching of the gate power supply connection switching relay 37*a* and the CNT emitter grounding switching relay 37*b* to switch between the normal mode and the cleaning mode. The controller 38 may include a timer and may control the switching of the gate power supply connection switching relay 37*a* and the CNT emitter grounding switching relay 37*b* on the basis of a predetermined schedule. Alternatively, the controller 38 may include means for estimating the accumulated amount of an adsorbed material onto the CNT of the CNT emitter 32 and may control the switching of the gate power supply connection switching relay 37*a* and the CNT emitter grounding switching relay 37*b* on the basis of an estimated result. As the means for estimating the accumulated amount of the adsorbed material onto the CNT, it is sufficient to monitor the range of voltage rise of the gate power supply 36 in the normal mode. When the accumulated amount of the adsorbed material onto the CNT is increased, the voltage to be applied to the gate power supply 36 for electron emission rises. So, when the range of voltage rise becomes large, the mode is shifted from the normal mode to the cleaning mode.

Figure 6:
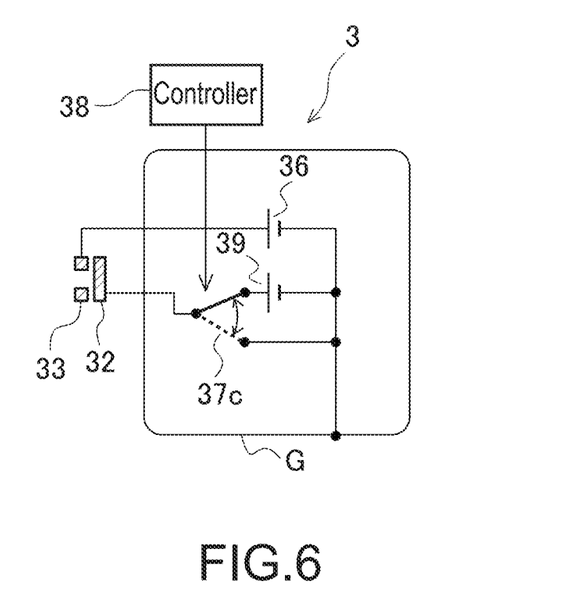
FIG. 6 is a circuit diagram showing another circuit configuration of the CNT electron source according to the first embodiment of the present invention.

The CNT electron source 3 shown in FIG. 5 has the circuit configuration to allow the CNT emitter 32 to be set at a positive potential with respect to the outer space by using the gate power supply 36. As shown in FIG. 6, however, the following circuit configuration may be provided, in which a CNT-emitter-positive-bias power supply 39 for setting the CNT emitter 32 at a positive potential with respect to outer space is added, and a relay 37*c* for supplying a current during a normal electron-emission operation is provided as the switching section in place of the gate power supply connection switching relay 37*a* and the CNT emitter grounding switching relay 37*b*. In the relay 37*c* shown in FIG. 6, the solid line indicates a state where the grounding to the CNT emitter 32 is disconnected and the power supply 39 is connected to the CNT emitter 32 (cleaning mode), and the dotted line indicates a state where the CNT emitter 32 is grounded to supply a current during the normal electron-emission operation (normal mode).

Second Embodiment

Figure 7:
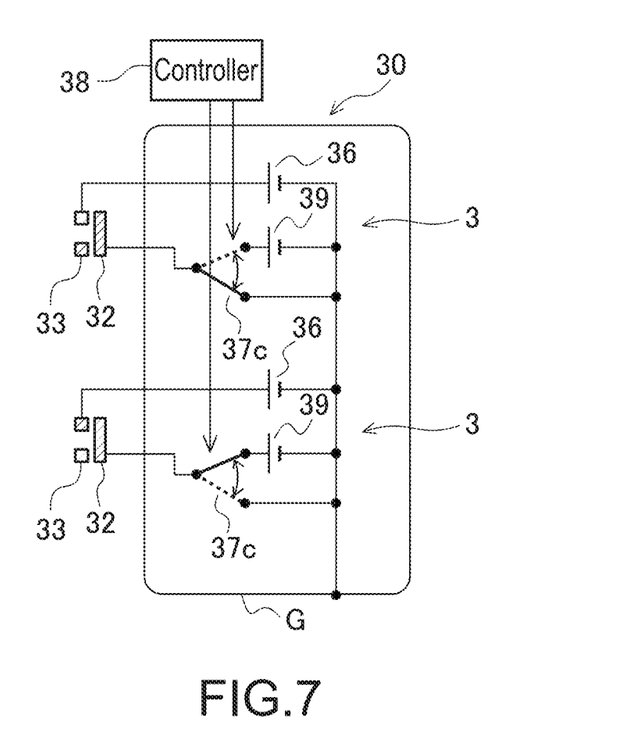
FIG. 7 is a circuit diagram showing a circuit configuration of a CNT electron source unit according to a second embodiment of the present invention.

FIG. 7 is a circuit diagram showing a circuit configuration of a CNT electron source unit 30 according to a second embodiment of the present invention.

Assuming that the cleaning effect is not satisfactorily produced only with the electrons in space plasmas, the CNT electron source unit 30 has a device configuration in which two or more CNT electron sources 3 having the circuit configuration according to the first embodiment are mounted, one or a plurality of CNT electron sources 3 emits or emit electrons to the other CNT electron source(s) 3, and the other CNT electron source(s) 3 emits or emit electrons to the one or plurality of CNT electron sources 3 to mutually clean the respective CNT emitters 32. FIG. 7 shows a state where the upper CNT electron source 3 performs a normal electron-emission operation, the electrons flow into the lower CNT electron source 3 whose CNT emitter 32 is biased to a positive potential, and the CNT emitter 32 of the lower CNT electron source 3 is cleaned. For example, a controller 38 alternately switches the one CNT electron source 3 and the other CNT electron source 3 between the normal mode and the cleaning mode at predetermined timings. Alternatively, the mode may be switched according to the accumulated amount of the adsorbed material onto the CNT by using the same means as in the first embodiment.

This case is also effective in eliminating the influences of adsorbed gas during storage on the ground, outgas emitted from itself, and the like when the CNT electron source is used in a place where space plasmas are rare, for example, in higher orbits such as geostationary orbits or deep space.

Originally, there is a high possibility of mounting a plurality of electron sources from the viewpoint of ensuring redundancy or the like, so the CNT electron source unit 30 according to the second embodiment can be achieved by effectively utilizing the plurality of configurations.

Note that the CNT electron source unit 30 shown in FIG. 7 includes two CNT electron sources 3 shown in FIG. 6, but may include three or more CNT electron sources 3. Alternatively, a plurality of CNT electron sources of another configuration, for example, a plurality of CNT electron sources 3 shown in FIG. 5 may be mounted.

THIRD EMBODIMENT

Figure 8:
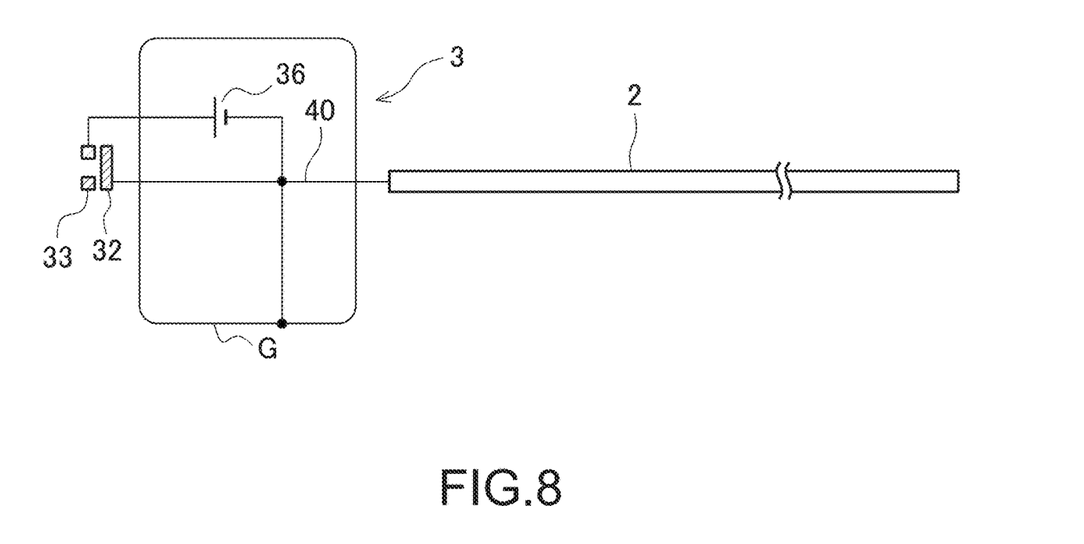
FIG. 8 is a circuit diagram showing a circuit configuration of a CNT electron source according to a third embodiment of the present invention.

FIG. 8 is a circuit diagram showing a circuit configuration of a CNT electron source 3 according to a third embodiment of the present invention.

The CNT electron source 3 includes, as an irradiation section, a connection section 40 that electrically connects one end of a tether 2 and a CNT emitter 32 to each other. When the CNT electron source is utilized as an electron emission source of an EDT 1, the CNT emitter 32 is irradiated with electrons in space plasmas without using an external power source or the like to clean the CNT emitter 32 at a timing when a self-induced electromotive force generated by the tether 2 is reversed by a relative relationship with a magnetic field and thus the spacecraft is positively charged. In the case of an orbit with a large orbital inclination as shown in FIG. 2, the induced electromotive force generated by the tether 2 is reversed to be positive or negative depending on timing, so that the potential of the CNT emitter 32 automatically becomes positive or negative with respect to space plasmas. When the potential becomes negative, the normal mode is set, and when the potential becomes positive, the cleaning mode is set.

<Modifications>

The present invention can be modified in various ways.

For example, the application of the positive potential to the CNT emitter 32 in the first embodiment or second embodiment may be operated in a pulsed manner alternately with the normal electron-emission operation. This makes it more effective to suppress the degradation of the characteristics of the CNT electron source 3.

The voltage for a positive potential applied to the CNT emitter 32 in the first embodiment may be varied to control the balance between cleaning effectiveness and power consumption or the like at every stage of the mission.

In the embodiments described above, the CNT emitter 32 including the emitter formed of the CNT has been exemplified, but the present invention can also be applied to the cases where nanocarbon materials other than CNT, such as graphene, carbon nanofibers, and carbon nanocoils, are used for the emitter, and similar effects are produced.

In the third embodiment described above, the CNT electron source 3 is mounted at one end of the tether 2. However, in either case of the electron emission and the emitter cleaning in which the CNT electron sources 3 are mounted not at one end but at both ends of the tether 2 and the potential difference between the CNT emitter 32 and space plasmas is reversed, a state where a CNT electron source 3 at one end emits electrons and a CNT electron source 3 at the other end cleans the emitter is periodically repeated, thus allowing the CNT electron sources 3 to have a long life while effectively generating a propulsion force.

Although the example in which the CNT electron source 3 according to the present invention is mounted on the EDT has been described in the embodiments described above, the present invention can also be applied to a case where a CNT electron source is used as a neutralizer for electric propulsion of ion engines and the like and also a case of a place where space plasmas are rare. In such cases, a positive potential is applied to the CNT emitter to attract electrons to the CNT emitter from plasmas in a discharge chamber of an ion engine or the like, to clean the CNT emitter.

In the electron source according to the present invention, a plurality of CNT electron sources are adapted to be arranged as shown in the second embodiment and to be capable of emitting electrons to each other when the CNT electron sources are used in devices such as X-ray sources, various light sources, and displays for terrestrial use, not for space use, so that the life of the device can be extended.

REFERENCE SIGNS LIST

1: EDT
2: tether
3: CNT electron source
30: CNT electron source unit
31: substrate
32: CNT emitter
33: gate electrode
34: shield member
35: mask
36: gate power supply
37a: gate power supply connection switching relay
37b: CNT emitter grounding switching relay
37c: relay
39: power supply
40: connection section

The invention claimed is:

1. An electron source, comprising:
an emitter configured to emit electrons, the emitter including a nanocarbon material;
a gate electrode configured to extract electrons from the emitter; and
an irradiation section that causes the gate electrode to emit electrons to irradiate the emitter with electrons,
wherein the irradiation section includes a connection section that electrically connects a predetermined portion of a spacecraft and the emitter to each other.

2. The electron source according to claim 1, wherein the irradiation section includes a switching section that switches a connection destination of a gate power supply from the gate electrode to the emitter and also disconnects grounding to the emitter.

3. The electron source according to claim 1, wherein the irradiation section includes
a bias application power supply configured to apply a bias of a positive potential to the emitter, and
a switching section that switches a connection destination of a gate power supply from ground to the bias application power supply.

4. The electron source according to claim 1, wherein the predetermined portion of the spacecraft is a tether.

5. An electron source unit, comprising
a first electron source; and
a second electron source,
wherein each of the first electron source and the second electron source comprises an emitter for emitting electrons, the emitter including a nanocarbon material, a gate electrode configured to extract electrons from the emitter, and an irradiation section that causes the gate electrode to emit electrons to irradiate the emitter with electrons,
wherein the electron source unit has
a first mode of irradiating the emitter of the first electron source with electrons emitted from the second electron source, and
a second mode of irradiating the emitter of the second electron source with electrons emitted from the first electron source.

* * * * *